United States Patent [19]

Shah

[11] Patent Number: 5,411,683
[45] Date of Patent: May 2, 1995

[54] METHOD FOR MAKING THERMOPLASTIC FOAM WITH COMBINED 1,1-DIFLUOROETHANE AND $CO_2$ BLOWING AGENT

[75] Inventor: Basit H. Shah, Evans, Ga.

[73] Assignee: Sweetheart Cup Company Inc., Chicago, Ill.

[21] Appl. No.: 110,276

[22] Filed: Aug. 20, 1993

[51] Int. Cl.⁶ .............................................. B29C 44/20
[52] U.S. Cl. ....................................... 264/50; 264/53; 264/DIG. 5
[58] Field of Search ................. 264/51, 50, 53, DIG. 5

[56] References Cited

U.S. PATENT DOCUMENTS

| | | |
|---|---|---|
| 2,666,036 | 1/1954 | Schwencke . |
| 2,746,088 | 5/1956 | Lindemann et al. . |
| 2,829,117 | 4/1958 | Lindemann . |
| 2,848,739 | 8/1958 | Henning . |
| 2,928,130 | 4/1960 | Gray . |
| 3,113,116 | 12/1963 | Smythe et al. . |
| 3,160,688 | 12/1964 | Aykanian et al. . |
| 3,251,911 | 5/1966 | Hansen . |
| 3,301,798 | 1/1967 | Waterman et al. . |
| 3,640,918 | 2/1972 | Fuchs . |
| 3,751,537 | 8/1973 | Scotto et al. . |
| 3,758,425 | 9/1973 | Jastrow et al. . |
| 3,760,968 | 9/1973 | Amberg et al. . |
| 3,770,670 | 11/1973 | Kuhlow et al. . |
| 3,787,542 | 1/1974 | Gallagher et al. . |
| 3,835,209 | 9/1974 | Karabedian . |
| 3,871,802 | 3/1975 | Blackwelder . |
| 3,933,548 | 1/1976 | Anderson, Jr. . |
| 3,960,792 | 6/1976 | Nakamuro . |
| 3,970,620 | 7/1976 | Ihde, Jr. . |
| 3,972,970 | 8/1976 | Taylor . |
| 3,979,000 | 9/1976 | Karabedian . |
| 3,981,649 | 9/1976 | Shimano et al. . |
| 3,988,404 | 10/1976 | Orimo et al. . |
| 4,053,346 | 10/1977 | Amberg et al. . |
| 4,069,934 | 1/1978 | Karabedian . |
| 4,070,310 | 1/1978 | Schneider et al. . |
| 4,084,490 | 4/1978 | Doherty . |
| 4,124,336 | 11/1978 | Johnson . |
| 4,205,137 | 5/1980 | Akiyama . |
| 4,307,134 | 12/1981 | Milkovich et al. . |
| 4,309,160 | 1/1982 | Poutanen et al. . |
| 4,333,898 | 6/1982 | Schmidtchen . |
| 4,344,710 | 8/1982 | Johnson et al. . |
| 4,369,227 | 1/1983 | Hahn et al. . |
| 4,376,741 | 3/1983 | Stenzel . |
| 4,419,309 | 12/1983 | Krutchen . |
| 4,420,448 | 12/1983 | Krutchen . |
| 4,424,287 | 1/1984 | Johnson . |
| 4,436,679 | 3/1984 | Winstead . |
| 4,455,272 | 6/1984 | Schubert et al. . |
| 4,463,861 | 8/1984 | Tsubone et al. . |

(List continued on next page.)

FOREIGN PATENT DOCUMENTS

| | | |
|---|---|---|
| 529339 | 6/1983 | Australia . |
| 406206 | 1/1991 | European Pat. Off. . |
| 450331 | 10/1991 | European Pat. Off. . |
| 1520790 | 7/1969 | Germany . |

OTHER PUBLICATIONS

Zwolinski, et al., "Extruded Polystyrene Foam With CFC/Carbon Dioxide Blowing Agents," *ANTEC '86*, pp. 30–33.

Shankland, et al., "Diffusion of Gases in Closed Cell Foams: A Comparison of Experiment with Theorty," *ANTEC '86*, pp. 34–37.

*Primary Examiner*—Allan R. Kuhns
*Attorney, Agent, or Firm*—Jones, Day, Reavis & Pogue

[57] ABSTRACT

A method is disclosed for making thermoplastic foam wherein the blowing agent is a combination of 1,1-difluoroethane and $CO_2$ gas. Applicant has found that the combined blowing agents unexpectedly have significantly enhanced blowing agent efficiency, so that 1 lb of $CO_2$ gas per hour can replace as much as 2–3 lbs 1,1-difluoroethane per hour, while still providing satisfactory efficiency as a blowing agent. The foams so produced are capable of being manufactured into foam articles of acceptable quality. Preferred proportions of the blowing agents to produce foams of desired densities are disclosed.

19 Claims, No Drawings

U.S. PATENT DOCUMENTS

| | | |
|---|---|---|
| 4,464,320 | 8/1984 | Saidla . |
| 4,464,484 | 8/1984 | Yoshimura et al. . |
| 4,470,938 | 9/1984 | Johnson . |
| 4,476,159 | 10/1984 | Mead et al. . |
| 4,521,541 | 6/1985 | Rutherford et al. . |
| 4,528,300 | 7/1985 | Park ................................. 521/79 |
| 4,547,328 | 10/1985 | Yuto et al. . |
| 4,567,681 | 2/1986 | Fumel . |
| 4,568,702 | 2/1986 | Mascioli . |
| 4,574,020 | 3/1986 | Fosnaught . |
| 4,578,231 | 3/1986 | Molteni . |
| 4,579,710 | 4/1986 | Krutchen et al. . |
| 4,581,262 | 4/1986 | Karabedian . |
| 4,585,679 | 4/1986 | Karabedian . |
| 4,591,606 | 5/1986 | Bergstrom . |
| 4,596,832 | 6/1986 | Ariga et al. . |
| 4,598,098 | 7/1986 | Krutchen et al. . |
| 4,636,527 | 1/1987 | Suh et al. . |
| 4,657,715 | 4/1987 | Myers et al. . |
| 4,747,983 | 5/1988 | Colombo . |
| 4,889,669 | 12/1989 | Suzuki . |
| 5,082,608 | 6/1992 | Karabedian et al. . |
| 5,106,882 | 4/1992 | Suh et al. . |
| 5,120,481 | 6/1992 | Brackman et al. . |
| 5,147,896 | 9/1992 | York . |
| 5,149,726 | 9/1992 | Deblander . |
| 5,158,986 | 10/1992 | Cha et al. . |
| 5,162,381 | 11/1992 | Richard et al. . |
| 5,189,071 | 2/1993 | Rhoads et al. . |
| 5,189,072 | 2/1993 | Rhoads et al. . |
| 5,204,169 | 4/1993 | York . |
| 5,215,691 | 6/1993 | Bland et al. . |
| 5,244,927 | 9/1993 | Binder et al. . |
| 5,244,928 | 9/1993 | Smith et al. . |
| 5,250,577 | 10/1993 | Welsh . |
| 5,269,987 | 12/1993 | Reedy et al. . |
| 5,288,740 | 2/1994 | Park et al. . |

METHOD FOR MAKING THERMOPLASTIC FOAM WITH COMBINED 1,1-DIFLUOROETHANE AND $CO_2$ BLOWING AGENT

BACKGROUND OF THE INVENTION

This invention relates to methods and compositions for forming blown extruded thermoplastic foams. More particularly, this invention relates to improved methods and compositions for forming blown extruded thermoplastic foams which methods and compositions advantageously avoid the use of blowing agents believed to be harmful to the Ozone layer of the stratosphere.

It is known in the art of foam products that thermoplastic foams may be produced by extruding a molten mass of thermoplastic material mixed with an appropriate blowing agent which is volatile at the temperature of the extrusion. The blowing agent is thoroughly mixed with the molten thermoplastic mass under high pressure. The molten mass is then extruded into a region of lower pressure, whereby the volatile blowing agent expands to form cells in the mass, resulting in a cellular structure called foam. The foam may be extruded by a screw extruder through an annular die, such that the foam is extruded as an elongated tubular body which may then be slit into sheets.

These volatile blowing agents are generally of a type which are sufficiently soluble in the thermoplastic material and have a diffusion rate through the thermoplastic material sufficient to provide a controlled rate of expansion upon extrusion. It is recognized in the art that foam bodies made by such methods and compositions may have to be aged prior to being formed into useful articles, in order to first allow a part of the residual volatile blowing agent to diffuse out of the foam and air to diffuse into the cells. In addition, any remaining blowing agent can result in post-extrusion expansion of the foam when articles are subsequently manufactured by heat forming methods. It is known that the choice of volatile blowing agent may vary with the particular thermoplastic resin being extruded. For some thermoplastics, it is desirable that the volatile blowing agent also act as a plasticizer to facilitate extrusion of the molten mass. These volatile blowing agents are generally selected because they are readily available and inexpensive.

Common blowing agents of the prior art include organic solvents which are highly volatile at extrusion temperatures. These organic solvents typically include the simple alkanes such as butane, isobutane, pentane, hexane, and the like. These blowing agents readily volatilize under extrusion conditions, and also provide an incidental plasticizing effect with many common thermoplastic materials used to make foams.

Certain halogenated hydrocarbons also have become popular as blowing agents, particularly in the extrusion of polystyrene foam. These halogenated hydrocarbon blowing agents include many of the chlorofluorocarbon compounds such as trichlorofluoromethane (CFC-11), dichlorodifluoromethane (CFC-12), chlorodifluoromethane (HCFC-22), and 1,1-dichloro-2,2,2-trifluoroethane, as well as methylene chloride and 1,1,1-trichloroethane. The halogenated hydrocarbons also have the beneficial incidental plasticizing effects associated with the alkane blowing agents.

Recent speculation, however, has suggested that the release of some of these compounds into the atmosphere may be damaging to the environment, particularly to the Ozone layer of the earth's stratosphere. For example, CFC-11 and CFC-12 have not been used as blowing agents since about 1988, and under the Clean Air Act the use of HCFC-22 as a foam blowing agent is being phased out by the end of the year 1993. Elimination of the use of these volatile agents in industrial processes in general, and in the production of thermoplastic foam in particular, has been the target of this work.

Prior attempts have been made to substitute non-polluting blowing agents for at least part of the commonly used organic blowing agents. Atmospheric gases such as nitrogen and carbon dioxide have been suggested as alternative blowing agents. Generally, the use of atmospheric gases as blowing agents has posed significant problems in the control of the extrusion and foaming processes. The lack of plasticizing effect of the foaming agent results in a more viscous extrudate, requiring the extruder to operate at greater torque and at higher temperatures, resulting in undesirable heat transfer to the extrudate. In addition, the very low solubility of the atmospheric gases in common thermoplastics and their rapid rate of diffusion through thermoplastic materials create problems in control of foaming in the extrudate. Loss of control in the production of foam at commercial rates can result in non-homogeneous cell size, burst cells and foam of uneven thickness and density. Each of these results can lead to weaknesses in the foam structure rendering it unacceptable for subsequent use in the manufacture of finished articles.

It has been found that the foregoing problems can be overcome, and acceptable foam can be made at commercial production rates, when $CO_2$ or another atmospheric gas is used as the blowing agent and the thermoplastic mass is provided with an effective amount of a non-fugitive plasticizing agent and a nucleating agent. This method is disclosed in the co-pending application Ser. No. 819,613, filed on Jan. 9, 1992, based on a parent application Ser. No. 497,731 filed Mar. 19, 1990, and a grandparent application Ser. No. 194,230 filed May 11, 1988, assigned to the common assignee herein, and incorporated herein by reference in its entirety. The use of gaseous $CO_2$ blowing agent as disclosed in that co-pending application has been found to make foam suitable for the manufacture of a variety of products, and in particular foam beverage cups and labels.

Because of its low solubility and high rate of diffusion in molten thermoplastic and thermoplastic foam, however, gaseous $CO_2$ foam has been less satisfactory as a blowing agent in the manufacture of low density foams, such as those in the density range of about 4 lbs/ft$^3$. Such low density foams are typically used for applications such as foam tableware, including foam plates and bowls. In prior attempts to make low-density foam at commercial output rates, it has been found that the use of pure $CO_2$ blowing agent, even with an effective amount of a non-fugitive plasticizing agent and nucleating agent, results in low-density foam having unacceptable surface corrugations.

One hydrocarbon blowing agent which is believed to have no undesirable Ozone depletion potential (ODP) is 1,1-difluoroethane, or $CH_3CHF_2$, also known in the industry as Formacel Z-2. As disclosed in U.S. Pat. No. 5,147,896, issued Sep. 15, 1992 to York and assigned to E. I. dupont de Nemour and Company, Formacel Z-2 has been proven satisfactory as a blowing agent for low-density thermoplastic foam. In fact, Formacel Z-2 can produce foam of the same low density as that produced with HCFC-22, but with using about 20–25% less Formacel Z-2 than HCFC-22, on a mass basis. This is because the molecular weight of HCFC-22 is 86, while the molecular weight of Formacel Z-2 is only 66; i.e., the molecular weight of Formacel Z-2 is about 25% less than the molecular weight of HCFC-22. Thus, pound for pound, Formacel Z-2 is more efficient as a blowing agent than HCFC-22. Even with this greater efficiency, however, Formacel Z-2 is expensive to use as a blowing agent for foam production on an industrial scale.

SUMMARY OF THE INVENTION

It is thus one object of the invention to provide a process for preparing an extruded foam body without the use of blowing agents known to be harmful to the earth's Ozone layer.

It is another object of the invention to provide a process for preparing an extruded low density foam body capable of being manufactured into foam articles, wherein said process does not require the use of blowing agents known to be harmful to the earth's Ozone layer.

It is still another object of the invention to provide a process for preparing an extruded low density foam body, wherein said process does not require the use of blowing agents known to be harmful to the earth's Ozone layer, and which is efficient and economical to use on an industrial scale.

Other objects, advantages, and novel features of the instant invention will be recognized by one skilled in the art upon reading the specification hereof and the appended claims.

In accordance with the invention, a foam body is prepared by providing a composition comprising a molten thermoplastic resin and a nucleating agent; introducing an amount of Formacel Z-2 blowing agent into the molten composition; introducing an amount of gaseous $CO_2$ blowing agent into the molten composition at an elevated pressure and at a temperature sufficient to maintain the $CO_2$ in a gaseous state; dispersing the Formacel Z-2 blowing agent and gaseous $CO_2$ blowing agent through said molten composition; reducing the temperature of said molten composition while maintaining said dispersion of blowing agents; and extruding the mixture of molten composition and blowing agent from a region of higher pressure to a region of lower pressure to produce a foam body, by substantially conventional means as are known in the art. In addition to acting as a blowing agent, the Formacel Z-2 contributes to the plasticizing of the molten thermoplastic resin. In a preferred embodiment of the invention, the thermoplastic resin is polystyrene; the Formacel Z-2 is partially soluble in polystyrene, and to some extent thus also remains in the foam after extrusion. When Formacel Z-2 and $CO_2$ are used together as blowing agents, the Formacel Z-2 contributes to a greater control of the extrusion and foaming processes and produces foam having a smoother surface.

The instant invention advantageously and uniquely provides for the production of a foam body of quality comparable to that of conventional prior art foams and capable of being made into a variety of articles, without introducing any compounds known to be harmful to the earth's Ozone layer.

The instant invention also provides the added unexpected advantage of significantly enhancing the blowing agent efficiency. That is, the combination of $CO_2$ and Formacel Z-2 blowing agents is much more efficient as a blowing agent than would be an equimolar amount of Formacel Z-2 alone. This improved efficiency was unknown and unexpected, and is a significant advantage.

The instant invention allows for the preparation of a foam body with pre-determined density, thickness, and orientation properties, as desired, for the production of one or more articles from the foam body. While the foam body so made is generally suitable for any application requiring controlled density, thickness and orientation, it is especially suitable for the manufacture of food service articles. The foam body may be made, for example, at a density in the range of about 8–14 lbs/ft$^3$ which is suited to the manufacture of foam cups; or at a density of about 6–8 lbs/ft$^3$, which is suited to the manufacture of sandwich packages; or at a density in the range of about 3–6 lbs/ft$^3$, which is particularly suited to the manufacture of foam tableware such as plates and bowls. The foam produced by the method of the instant invention may also be provided with a layer of film on at least one surface thereof, by known coextrusion techniques, to enhance the appearance of the final product.

DETAILED DESCRIPTION OF THE INVENTION

Throughout this patent specification, "Formacel Z-2" shall mean 1,1-difluoroethane.

In accordance with the method of the instant invention, a quantity of thermoplastic resin is brought to a molten state, such as by means of a screw extruder. A quantity of $CO_2$ gas and a quantity of Formacel Z-2 is introduced to the melt and dispersed therein. The $CO_2$ acts as a blowing agent, and the Formacel Z-2 acts as both a blowing agent and a plasticizer. Because of the plasticizing effect of the Formacel Z-2, the molten composition with the combination of blowing agents dispersed therein can be cooled to a temperature low enough so that the $CO_2$ gas will not come out of solution from the resin but will remain dissolved or dispersed therein, while the Formacel Z-2 lowers the viscosity of the composition so that a high torque on the screw and a high die pressure are not required to extrude the composition. The composition of molten thermoplastic resin with $CO_2$ and Formacel Z-2 dispersed therein is then extruded through a die from a region of higher pressure to a region of lower pressure to produce a foam body. The foam body so made is suitable for use in manufacturing foam articles such as food service articles.

The $CO_2$ may be introduced at an elevated pressure and at a temperature sufficient to maintain it in a gaseous state. In addition to $CO_2$, or in place thereof, other inert atmospheric gases such as $N_2$ may also be used, Formacel Z-2 may be in the liquid state at the temperatures and pressures at which it is introduced into the extruder in accordance with the invention herein. As the invention is presently understood, it is believed that whether either of the blowing agents is introduced in the gaseous or liquid state is immaterial to the operation of the inventive process for making an acceptable foam body, as long as the blowing agents are adequately dispersed through the composition prior to extrusion. Preferably, the operating conditions at which the $CO_2$ and Formacel Z-2 blowing agents are introduced are sufficient to maintain a relatively uniform dispersion of the blowing agents in the molten composition.

This detailed description of the invention is presented for purposes of convenience and illustration for the case in which the thermoplastic resin extruded is polystyrene. It is to be understood, however, that the invention as a whole is not intended to be so limited, and that one skilled in the art will recognize that the concept of the invention will be applicable to other thermoplastic resins which may be formed in accordance with the techniques discussed herein. These resins may include but are not necessarily limited to vinyl aromatic polymers such as polymers of styrene, alkylated or halogenated styrenes, polyolefins, polyvinyl chloride, polyphenyleneoxide-polystyrene blends, rubber reinforced polystyrene, acrylonitrile-butadiene-styrene copolymer and styrene-acrylonitrile copolymer. Other resins and resin blends suitable for use in the instant invention will be readily apparent to those skilled in the art.

A nucleating agent may be added to the molten composition to facilitate the formation of gas bubbles in the molten resin extrudate. Conventional nucleating agents may be used such as talc or talc concentrate, calcium silicate, alkali carbonate salts, and citric acid. Also suitable are commercial nucleating agents such as Hydocerol ® powder either alone or pre-blended into appropriate resins, such as Hydrocerol ® CLM-70 and Hydrocerol ® CF-40, available from Boehringer-Ingelheim (Germany). It has been found that less nucleating agent is required in the method of the instant invention than in prior art methods.

The instant invention may be practiced with conventional foam extrusion equipment as is widely used and known in the art, and as generally disclosed in prior art patents U.S. Pat. Nos. 3,751,537, 3,835,209, 3,871,802, 3,981,649, 4,344,710, 4,424,287, 4,455,272, and 4,657,715, all incorporated herein by reference. Such equipment generally comprises a feeding apparatus by which resin and nucleating agent are fed into the system; a heating apparatus which heats and melts the resin, and mixes in the nucleating agent to form a molten mass; a means for introducing the blowing agents into said molten mass; a mixing apparatus which mixes the blowing agents relatively homogeneously throughout the molten mass; and a cooling apparatus which cools the molten mass to a suitable extrusion temperature. The means for introducing the blowing agents may comprise a first injection port for introducing the $CO_2$ and a second injection port for introducing the Formacel Z-2. The injection ports may be located at suitable locations along the length of the extruder, and either blowing agent may be introduced through either injection port, as long as the proper mass ratio of the blowing agents is maintained and as long as both blowing agents are adequately dispersed through the composition prior to extrusion. The molten mass is extruded through a die from a region of higher pressure to a region of lower pressure. Any commercial die suitable for foam extrusion can be used. Upon entering the region of lower pressure the blowing agents expand to form interstitial cells in the mass, thereby creating a foam. As is known, the heating apparatus and mixing apparatus may comprise a primary extruder. As is further known, the cooling apparatus may comprise a secondary extruder of larger diameter than the primary extruder, or it may comprise other known cooling means such as a planetary gear mixer cooler, a dynamic mixer cooler or a tubular heat exchanger with or without mixing elements in the tubes. Cooling of the composition while maintaining the dispersion of blowing agents facilitates controlled foaming during the extrusion step.

In addition to avoiding the use of materials potentially hazardous to the environment, the instant invention provides the further advantage of significantly enhancing the blowing agent efficiency. The applicant has found that, unexpectedly, the combination of $CO_2$ and Formacel Z-2 blowing agents is much more efficient than would be an equimolar amount of Formacel Z-2 alone. In theory, the mass of $CO_2$ that would be used to replace a given mass of Formacel Z-2 would be expected to be based on the ratio of their molecular weights. Thus, $$\frac{\text{mol. wt. Formacel Z}-2}{\text{mol. wt. } CO_2} = \frac{66}{44} = 1.5,$$

such that, in accordance with accepted theory, it would be expected that one pound of $CO_2$ blowing agent would replace 1.5 pounds of Formacel Z-2 blowing agent, with no change in blowing agent efficiency. Applicant has found that the combination of $CO_2$ and Formacel Z-2 is much more efficient than would be predicted by theory, such that one pound of $CO_2$ can replace as much as 2–3 pounds of Formacel Z-2, while still providing satisfactory efficiency as a blowing agent, as shown in the Examples which follow.

In accordance with the invention, the combined $CO_2$/Formacel Z-2 is used in the amount of about 0.1–5.0 parts total blowing agent per 100 parts thermoplastic resin by weight, and preferably in the range of about 0.5–3.0 parts per 100 parts thermoplastic resin by weight. The amount of combined blowing agent used will be determined by the desired density of the extruded foam product. Generally, more combined blowing agent will cause greater expansion of the foam upon extrusion and result in a foam of lower density.

The mass ratio of Formacel Z-2/$CO_2$ is in the range of about 0.5–8.0, but this ratio also will vary with the desired density of the foam products. Generally, a higher Formacel Z-2/$CO_2$ ratio will result in a lower density foam product.

The foam body may be extruded in the form of an elongated tubular sheet which can be cut into two flat sheets according to well-known techniques such as are disclosed in the above incorporated patents. The extrusion conditions such as operating temperatures, line speeds, and production rates may be controlled such that the extruded foam body is of pre-determined thickness, density, smoothness and molecular orientation. The extrusion conditions may be varied to obtain an orientation gradient through the thickness of the foam sheet, or to obtain selective biaxial orientation of the sheet. The density, thickness, smoothness and orientation properties of the sheet formed from the foam body can be pre-determined to improve the characteristics of the final products made from the foam sheet. In particular, oriented foam is useful in the manufacture of articles which require shrinkage of a portion of a foam sheet about a heated mandrel. Two-piece foam cups can be made in this manner, as disclosed in U.S. Pat. No. 4,053,346 and U.S. Pat. No. 4,084,490 which are incorporated herein by reference. Furthermore, the foam body can be extruded simultaneously with a film material by known means to provide a foam-film composite. Such a foam-film composite is referred to hereinafter as coextruded foam.

Upon extrusion of the composition into a foam body, it is believed that the $CO_2$ diffuses out of the foam cells almost immediately, while the Formacel Z-2 remains trapped within the cells for some time. Thus, it may be desirable to age the extruded foam body, as is known in the art, for a period of time such as 1-4 days, before the extruded foam body is used in the manufacture of foam articles. Even after aging, there may still be some residual Formacel Z-2 remaining in the foam cells, which may advantageously cause further expansion of the foam during subsequent thermoforming steps, as is also known in the art.

Many commercially available resins commonly used in the production of polystyrene foam articles are suitable for use in the instant invention. Such resins include, for example, Dow 685, BASF 1800, Amoco R1, and other standard foam resins. The examples disclosed in this specification are presented by way of illustration and not by way of limitation. It is to be understood that the properties of the resins used in the examples which follow are typical properties of resins that will perform satisfactorily in the invention, and are not intended to limit the choice of resin.

The following Examples are prepared from polystyrene sold under the trade name Novacor 103 and available from Novacor Incorporated, 29 Fuller Street, Leominster, Mass. 01453. Novacor 103 has a number average molecular weight in the range $135-140 \times 10^3$, a weight average molecular weight in the range $305-325 \times 10^3$, a melt flow of 1.3-1.8 gr/10 min. as measured under ASTM D 1238 condition G, a Vicat temperature of 226°-228° F. as measured by ASTM D 1525, and tensile strength of 7300-7800 psi as measured by ASTM D 638.

Many of the examples in this specification also include the use of "repelletized material." As is known in the art, the manufacture of articles from polystyrene foam necessarily results in a substantial amount of wasted foam material. It is a common practice in the industry to repelletize this material and mix it with virgin resin in an extrusion system. The repelletized material has a thermal history which may affect the properties of the newly extruded foam body. Nevertheless, it is considered highly desirable to be able to use repelletized waste material to the extent that it will not adversely affect the properties of the foam body being extruded or the articles ultimately made from the foam body.

In each of the following examples, the primary and secondary extruder temperature profiles were substantially similar to the temperature profiles commonly known and practiced for extrusion of like foams, as are known to those skilled in the art. Also, in each of the following examples, the extrusion die pressures were substantially similar to those experienced with commercial foams made with HCFC-22 blowing agent.

In the Tables in each of the following examples, "Formacel Z-2" is abbreviated as "Z-2," and talc concentrate is abbreviated as simply "talc."

EXAMPLE I

Polystyrene foam suitable for use in the manufacture of sandwich packages was prepared. Such foam typically has a density of about 7.0 lbs/ft$^3$, and is about 65 mils thick upon extrusion. In this Example, one run was done with the prior art HCFC-22 blowing agent, two runs were done with only Formacel Z-2 as the blowing agent, and one run was done with a combination of $CO_2$ and Formacel Z-2. The equipment used was a two-extruder system having a 4½" primary extruder and a 6" secondary extruder, typical of commercial two-extruder systems; the die system comprised a foam die, a mandrel and an air ring such as are known in the prior art and generally disclosed in the prior art patents incorporated by reference above. Talc was used as the nucleating agent in the amount necessary to achieve a desired cell size. The material mix used for this Example was 38% virgin resin, 60% repelletized resin, and 2% talc. The extrusion conditions for each of the four runs are set forth in Table I.

TABLE I

|  | Ex. Ia | Ex. Ib | Ex. Ic | Ex. Id |
| --- | --- | --- | --- | --- |
| Blowing Agent | HCFC-22 | Z-2 | Z-2 | Z-2/CO$_2$ |
| Blowing Agent Flow Rate (lbs/hr) | 23.0 | 18.0 | 16.0 | 10/4 |
| Foam Production Rate (lbs/hr) | 552 | 558 | 551 | 550 |
| Primary Extruder: | | | | |
| RPM | 91 | 93 | 91 | 93 |
| Amps | 154 | 159 | 155 | 153 |
| Secondary Extruder: | | | | |
| RPM | 17 | 18 | 17 | 18 |
| Amps | 175 | 177 | 179 | 182 |
| Die Melt Temp. (°F). | 318 | 318 | 319 | 321 |

A comparison of Example Ia with Example Ib shows that about 25% more HCFC-22 than Formacel Z-2 was required to produce an equivalent foam. This is the result that would be expected based on their molecular weights. A comparison of Examples Ib and Ic with Example Id shows that a combination of 10 lbs/hr of Formacel Z-2 and 4 lbs/hr of $CO_2$ as the blowing agent is about equivalent to about 16-18 lbs/hr of 100% Formacel Z-2, based on the caliper and density of the extruded foam. That is, 4 lbs of $CO_2$ was used to replace 6-8 lbs of Formacel Z-2, or, each pound of $CO_2$ replaced 1.5-2 lbs of Formacel Z-2.

The combined blowing agents also serve as a partial nucleator and allow a reduction of the nucleation level to achieve the desired cell size. A slight corrugation in the foam of Example Id was observed, indicating that the foam was slightly over-nucleated and that even less nucleating agent could have been used to achieve a foam of good surface quality. The foam of Example Id, which was extruded at a caliper of 65 mils, expanded after extrusion to 175 mils when placed in boiling water for one minute, indicating that the foam cells were closed. Other tests also indicated that substantially all of the cells were closed. The foam thermoformed satisfactorily into sandwich packages.

EXAMPLE II

Polystyrene foam of lower density and suitable for use in the manufacture of tableware was prepared. Such foam typically has a density of about 4 lbs/ft.$^3$ In this Example, one run was done with HCFC-22 blowing agent, one run was done with only Formacel Z-2 blowing agent, and one run was done with a combination of Formacel Z-2 and $CO_2$. The equipment used was a two-extruder system substantially similar to the tandem extruder used in Example I above. In each case, the foam product had a nominal basis weight of 10 g/ft$^2$, and was produced at a line speed of 50 ft/min with a web width of 51 inches and an extruder output of 562 lbs/hr. For each run of Example II, the die melt temperature of the extruder was in the range of about 325°–335° F. The extrusion conditions for the three comparative runs are set forth in Table II.

TABLE II

|  | Ex. IIa | Ex. IIb | Ex. IIc |
|---|---|---|---|
| Blowing Agent | HCFC-22 | Z-2 | Z-2/$CO_2$ |
| Blowing Agent Flow Rate (lbs/hr) | 28 | 24 | 19/2.5 |
| Material Mix (%) Virgin/Repel/Talc | 25/73/2 | 25/74/1 | 25/74/1 |
| Primary Extruder: | | | |
| RPM | 97 | 97 | 97 |
| Amps | 145 | 142 | 150 |
| Secondary Extruder: | | | |
| RPM | 19.1 | 19 | 19.1 |
| Amps | 125 | 131 | 135 |

A comparison of Examples IIb and IIc shows that 2.5 lbs $CO_2$ proved to be an effective replacement for 5 lbs of Formacel Z-2; in other words, 2 lbs of Formacel Z-2 were replaced by one lb of $CO_2$. In addition, the foam of Example IIc made with the combined Formacel Z-2/$CO_2$ blowing agents was made with 50% less talc than the foam of Example IIb made with only Formacel Z-2 blowing agent, while still achieving equivalent cell size in the extruded foam. The extruded foam was successfully thermoformed into nine inch platters.

EXAMPLE III

Polystyrene foam suitable for use in the manufacture of tableware was prepared in the same extrusion system used in Example II. The nominal basis weight of the product was 10 g/ft$^2$ and the web width was 51 inches. Table III-1 shows the extrusion conditions for each run of foam manufacture. Table III-2 shows the average properties of foams made under the conditions shown in Table III-1.

For Examples IIIa–IIIe, the material mix on a weight percent basis was 29.5% virgin resin, 68.8% repelletized, and 1.7% talc. For Example IIIf the mix was 29.6% virgin resin 69% repelletized, and 1.4% talc. The lower amount of talc nucleating agent in Example IIIf had no substantial adverse effect on foam cell size, as shown in Table III-2.

TABLE III-1

|  | Ex. IIIa | Ex. IIIb | Ex. IIIc | Ex. IIId | Ex. IIIe | Ex. IIIf |
|---|---|---|---|---|---|---|
| Blowing Agent | HCFC-22 | Z-2 | Z-2/$CO_2$ | Z-2/$CO_2$ | Z-2/$CO_2$ | Z-2/$CO_2$ |
| Blowing Agent Flow Rate (lb/hr) | 26.8 | 21.5 | 16.1/2.9 | 10.8/5.4 | 11.3/5.7 | 7.1/8.0 |
| Foam Production Rate (lbs/hr) | 561* | 632 | 599.5 | 617 | 617 | 600 |
| Primary Extruder: | | | | | | |
| RPM | 95 | 95 | 95 | 95 | 95 | 95 |
| Amps | 130 | 135 | 135 | 138 | 138 | 138 |
| Secondary Extruder: | | | | | | |
| RPM | 19 | 19 | 19 | 18 | 18 | 18 |
| Amps | 115 | 100 | 120 | 115 | 115 | 117 |
| Die Melt Temp. (°F.) | 328 | 321 | 335 | 330 | 330 | 328 |

*Due to a calibration error in the on-line gauges, the number is uncertain. Based on the primary extruder RPM value, however, the output rate is believed to be comparable to that of Examples IIIb–IIIf.

A comparison of Example IIIa with Example IIIb shows that, as expected, about 25% by weight more HCFC-22 than Formacel Z-2 is needed to produce an equivalent foam. A comparison of Example IIIb with each of Examples IIIc–IIIf shows that, in each case, the number of pounds of Formacel Z-2 replaced by one pound of $CO_2$ was 1.9, 2.0, 1.8, and 1.8, respectively.

TABLE III-2

|  | Ex. IIIa | Ex. IIIb | Ex. IIIc | Ex. IIId | Ex. IIIe | Ex. IIIf |
|---|---|---|---|---|---|---|
| Caliper (mils) | | | | | | |
| Top | 51.0 | 52.6 | 50.2 | 42.3 | 43.0 | 41.2 |
| Bottom | 52.0 | 53.8 | 52.2 | 43.8 | 44.9 | 42.9 |
| Density (Btm) (lbs/ft$^3$) | 4.75 | 4.47 | 4.83 | 5.59 | 5.59 | 5.87 |
| Cell area (mm$^2$) | | | | | | |
| Mandrel Side | 0.127 | 0.101 | 0.100 | 0.091 | 0.090 | 0.073 |
| Outside surface | 0.085 | 0.072 | 0.061 | 0.068 | 0.076 | 0.074 |
| Shrinkage (%)* | | | | | | |
| Machine Direction | 35.1 | 28.3 | 25.0 | 35.6 | 33.4 | 32.7 |
| Cross Direction | 33.5 | 28.3 | 24.1 | 31.5 | 33.2 | 31.1 |
| Post-extrusion expansion (%)** | 100 | 103 | 102 | 116 | 116 | 121 |

*Measured by placing a 2" × 2" sample of foam in hot (250° F.) oil for one minute; equivalence in shrinkage in the machine and cross directions indicates that the extruded foam has a balanced orientation.
**Measured within one hour of extrusion by placing a sample in boiling water for 30 sec.; expansion indicates an absence of burst cells.

The foams so made were first laminated and then satisfactorily thermoformed into acceptable foam plates. The foams of examples IIIa, IIIb, and IIIc were thermoformed after two days of aging, and the foams of examples IIId and IIIe were thermoformed after one day of aging. Additional quantities of the foams of Example IIId and IIIe were thermoformed after one month of aging; acceptable foam plates were produced and were of satisfactory thickness and aesthetic value.

There was a slight increase in surface corrugation in the extruded foam as the percentage of $CO_2$ was increased beyond the amount shown in Example III-E. The slight corrugation had no adverse effect on the finished thermoformed plates, which had a smooth surface finish.

EXAMPLE IV

Additional runs were made on the same extrusion system as used in Examples II and III above to optimize the Formacel Z-2/$CO_2$ ratio. The thermoplastic composition used was 29.2% virgin resin, 66.7% repelletized resin, 1.65% talc nucleating agent, and 2.45% color.

The foam was extruded at a nominal basis weight of 10 g/ft$^2$, at a caliper of 48–53 mil and a sheet width of 51 inches The production data is shown in Table IV-1.

TABLE IV-1

|  | Ex. IVa | Ex. IVb | Ex. IVc | Ex. IVd | Ex. IVe |
|---|---|---|---|---|---|
| Blowing Agent | HCFC-22 | Z-2/$CO_2$ | Z-2/$CO_2$ | Z-2/$CO_2$ | Z-2/$CO_2$ |
| Blowing Agent Flow Rate (lbs/hr) | 26.6 | 14.0/5.0 | 13.2/5.0 | 11.5/5.8 | 8.5/7.5 |
| Foam Production Rate (lbs/hr) | 621.4 | 636.5 | 639.3 | 647.4 | 627.9 |
| Primary Extruder: |  |  |  |  |  |
| RPM | 95 | 95 | 95 | 95 | 95 |
| Amps | 135 | 135 | 138 | 138 | 138 |
| Secondary Extruder: |  |  |  |  |  |
| RPM | 19.1 | 19.0 | 19 | 19 | 19 |
| Amps | 128 | 126 | 133 | 133 | 122 |
| Die Melt Temp. (°F.) | 326 | 323 | 324 | 329 | 330 |

Based on Ex. IVa, the expected equivalent flow rate of Formacel Z-2 is 21.3 lbs/hr. On that basis, in each of Examples IVb–IVe, the number of pounds of Formacel Z-2 replaced by one pound of $CO_2$ was 1.5, 1.6, 1.7, and 1.7 respectively.

The physical properties of the foams so produced are set forth in Table IV-2. All foams had a nominal basis weight of 10 g/ft$_2$. Shrinkage and post-extrusion expansion were measured as in Example III. All foams had a post-extrusion expansion of 100–120%.

TABLE IV-2

|  | Ex. IVa | Ex. IVb | Ex. IVc | Ex. IVd | Ex. IVe |
|---|---|---|---|---|---|
| Caliper (mils) | 52.5 | 58 | 58 | 59 | 53 |
| Density (lbs/ft$^3$) | 4.84 | 4.53 | 4.55 | 4.57 | 4.96 |
| Cell area (mm$^2$) |  |  |  |  |  |
| Mandrel Side | .153 | .118 | .113 | .114 | .103 |
| Outside surface | .063 | .060 | .057 | .063 | .075 |
| Shrinkage (%) |  |  |  |  |  |
| Machine Direction | 29.9 | 32.8 | 34.4 | 33.6 | 38.3 |
| Cross Direction | 33.8 | 30.6 | 30.3 | 31.1 | 35.9 |

The foams of Examples IVa–IVe were thermoformed into plates after one day of aging. It was found that the foam of Example IVe, wherein 60% of the Formacel Z-2 was replaced by $CO_2$, produced plates with more caliper variation and undesirable aesthetics, such as small surface ruptures, than the foams of the other examples. The extrusion caliper of plates made from the other foams became thinner as more than 30% of the Formacel Z-2 was replaced by $CO_2$, indicating that somewhat less expansion occurred as the proportion of $CO_2$ in the blowing agent increased. After the foam rolls had been aged for one week, however, thermoformed plates made from all the foams were within the thickness specifications.

EXAMPLE V

Trials were run to make both skinless foam and coextruded foam using blowing agents of various proportions of Formacel Z-2 and $CO_2$. Cups were made from the foams after both one week and two weeks of aging. The resin used for both the skinless foam and the foam phase of the coextruded foam was about 70% virgin resin, about 30% repelletized resin, and about 0.15% Hydrocerol ® powder nucleating agent. The die melt temperatures for all the runs of Table V-1 and Table V-2 were in the range of 330°–350° F. Table V-1 contains the extrusion data for the coextruded foam; and data on the properties of the cups made from the coextruded foam. Table V-2 contains the extrusion data for the skinless foam, and data on the properties of the cups made from the skinless foam.

All of the foams were capable of being made into acceptable cups. One measure of the quality of such cups is the stiffness imparted to the cup at various points along its height. Stiffness is measured as the force in grams required to deflect the sidewall of the cup inwardly a known distance. The stiffness of dry empty cups was measured by applying a force 1" below the rim of the cup sufficient to deflect the cup wall inwardly ⅛". The test may also be conducted with the cup filled with hot water at 190° F. This simulates typical conditions of actual use, such as when the cup is filled with hot coffee. Under these conditions stiffness is measured by applying a force at the midpoint of the height of the cup sufficient to deflect the cup inwardly ¼". The force is measured by means of a force cell positioned diametrically opposite the force applying means. The data shows that the foams made in accordance with the method of the instant invention could be used to produce cups of a quality comparable with prior art foams.

TABLE V-1

| Coextruded Foam | Caliper: 25 mils, Density: 13.0 lbs/ft$^3$ Cell area: 0.045 mm$^2$ | | | | |
|---|---|---|---|---|---|
|  | Ex. Va | Ex. Vb | Ex. Vc | Ex. Vd | Ex. Ve |
| Blowing Agent | HCFC-22 | Z-2 | Z-2/$CO_2$ | Z-2/$CO_2$ | Z-2/$CO_2$ |
| Blowing Agent Flow Rate (lbs/hr) | 14.3 | 10.4 | 5.2/2.0 | 3.2/2.8 | 3.0/2.5 |
| Foam Production Rate (lbs/hr) | 840 ≈ 850 | 849.2 | 839.0 | 839.9 | 780.0+ |

TABLE V-1-continued

| Coextruded Foam | Caliper: 25 mils, Density: 13.0 lbs/ft³ Cell area: 0.045 mm² | | | | |
|---|---|---|---|---|---|
| | Ex. Va | Ex. Vb | Ex. Vc | Ex. Vd | Ex. Ve |
| Melt Pump RPM | 66 | 66 | 66 | 66 | 60 |
| Cups made after foam aged one week: | | | | | |
| Dry stiffness | 165 | 187 | 172 | 178 | |
| | (152–177) | (174–197) | 153–195) | (162–190) | |
| Hot (190° F.) Stiffness | 343 | 395 | 364 | 416 | |
| | (320–366) | (365–430) | (349–382) | (397–435) | |
| Cups made after foam aged two weeks: | | | | | |
| Dry stiffness | 173 | 176 | 160 | 175 | |
| | (106–193) | (166–189) | (152–172) | 160–194) | |
| Hot (190° F.) Stiffness | 375 | 384 | 356 | 393 | |
| | (349–403) | (371–402) | (339–381) | (378–408) | |

+Reduced output rate by ≈ 10% to minimize cell rupture.

Shrinkage of the foams of Table V-1 was measured by placing a 2"×2" from sample-in hot (250° F.) oil for 1 minute. The shrinkage in the machine direction ranged from 50–60%. The shrinkage in the cross direction ranged from −10.0% to +1.0%.

TABLE V-2

| Non-coextruded Foam | Caliper: 26.0 mils Density: 10.9 lbs/ft³ Cell area: 0.05 mm² | | | | |
|---|---|---|---|---|---|
| | Ex. Vf | Ex. Vg | Ex. Vh | Ex. Vi | Ex. Vj |
| Blowing Agent | HCFC-22 | Z-2 | Z-2/CO$_2$ | Z-2/CO$_2$ | Z-2/CO$_2$ |
| Blowing Agent Flow Rate (lbs/hr) | 18.0 | 14.3 | 7.2/2.3 | 5.9/3.1 | 4.2/3.5 |
| Foam Production Rate (lbs/hr) | 850 ≈ 860 | 858.0 | 854.0 | 849.0 | 848.0* |
| Melt Pump RPM | 78 | 78 | 78 | 78 | 78 |
| Cups made after foam aged one week: | | | | | |
| Dry Stiffness | 151 | 169 | 154 | 132 | |
| | (147–159) | (155–180) | (148–162) | (123–142) | |
| Hot (190° F.) Stiffness | 241 | 299 | 269 | 219 | |
| | (229–252) | (278–325) | (256–281) | (207–235) | |
| Cups made after foam aged two weeks: | | | | | |
| Dry Stiffness | 158 | 162 | 149 | 148 | |
| | (153–162) | (130–171) | (139–159) | (127–166) | |
| Hot (190° F.) Stiffness | 259 | 280 | 241 | 234 | |
| | (247–270) | (257–291) | (227–254) | (220–255) | |

*Small surface tears on far side of the top web.

Shrinkage of the foams of Table V-2 was measured by placing a 2"×2" foam sample in hot (210° F.) oil for 1 minute. The shrinkage in the machine direction ranged from 3–5%, and the shrinkage in the cross direction ranged from −1.0% to +1.0%.

A comparison of Example Vb with Examples Vc–Ve shows that the number of pounds of Formacel Z-2 replaced by one pound of CO$_2$ in Examples Vc–Ve was 2.6, 2.6, and 3.0, respectively. A comparison of Example Vg with Examples Vh–Vj shows that the number of pounds of Formacel Z-2 replaced by one pound of CO$_2$ in Examples Vh–Vj was 3.1, 2.7, and 2.9, respectively.

As may be seen, it was possible to reduce the amount of Formacel Z-2 and replace it with CO$_2$ by as much as 60% for the skinless foam and by as much as 70% for the coextruded foam at output rates of about 850 pounds per hour. Any further reduction in Formacel Z-2 resulted in small surface tears in the foam.

EXAMPLE VI

Non-laminated foam suitable for use in the manufacture of foam tableware was prepared. The material mix was 47.7% virgin resin, 47% repelletized resin, and 5.3% talc. The foam so made had a density of about 7 lbs/ft³, and had a nominal basis weight of about 14 g/ft². It was found that when the amount of Formacel Z-2 in the blowing agent was reduced by 50% by weight and replaced by CO$_2$ in an amount of about 1 lb. CO$_2$ per 2 lbs. of Formacel Z-2, then the corrugations became more visible and the sheet caliper dropped. When the amount of Formacel Z-2 in the blowing agent was increased to 60% on a mass basis, both the surface corrugations and foam caliper improved to an acceptable level as shown in Example VIc. The foam so produced was made into acceptable thermoformed plates.

The production conditions for this example are set forth in Table VI.

TABLE VI

| | Ex. VIa | Ex. VIb | Ex. VIc |
|---|---|---|---|
| Blowing Agent | HCFC-22 | Z-2 | Z-2/CO$_2$ |
| Blowing Agent Flow Rate (lbs/hr) | 22.7 | 18.2 | 10.9/3.7 |
| Foam Production Rate (lbs/hr) | 611.0 | 611.0 | 611.0 |
| Primary Extruder: | | | |
| RPM | 91 | 91 | 91 |
| Amps | 132 | 132 | 132 |
| Secondary Extruder: | | | |
| RPM | 19 | 19 | 19 |
| Amps | 115 | 112 | 121 |
| Die Melt Temp. (°F.) | 326 | 322 | 312 |

A comparison of Examples VIb and VIc shows that one pound of CO$_2$ replaced 2.0 lbs Formacel Z-2.

As may be seen from all of the foregoing examples, acceptable foam of varying densities can be made in accordance with the method of the instant invention. The density will vary with the amount of combined blowing agent used and the ratio of Formacel Z-2 to $CO_2$ in the combined blowing agent. Table VII below summarizes all of the foregoing examples wherein a combined Formacel Z-2/$CO_2$ blowing agent was used, and states the total parts of blowing agent used per one hundred parts of resin, the pounds of Formacel Z-2 used per pound of $CO_2$, and the density of the foam so produced.

TABLE VII

Summary of Data

| Example | parts ($CO_2$ + Z-2) 100 parts resin | lbs Z-2 replaced by 1 lb $CO_2$ | foam density (lbs/ft$^3$) |
|---|---|---|---|
| Id | 2.5 | 1.75 | ~7.0 |
| IIc | 3.8 | 2.0 | ~4.0 |
| IIIc | 3.2 | 1.9 | 4.83 |
| IIId | 2.6 | 2.0 | 5.59 |
| IIIe | 2.7 | 1.8 | 5.59 |
| IIIf | 2.5 | 1.8 | 5.87 |
| IVb | 3.0 | 1.5 | 4.53 |
| IVc | 2.8 | 1.6 | 4.55 |
| IVd | 2.7 | 1.7 | 4.57 |
| IVe | 2.5 | 1.7 | 4.96 |
| Vc | 0.86 | 2.6 | 13.0 |
| Vd | 0.71 | 2.6 | 13.0 |
| Ve | 0.71 | 3.0 | 13.0 |
| Vh | 1.1 | 3.1 | 10.9 |
| Vi | 1.1 | 2.7 | 10.9 |
| Vj | 0.91 | 2.9 | 10.9 |
| VIc | 2.4 | 2.0 | ~7.0 |

The foregoing description of an embodiment of the method of the instant invention is intended by way of illustration and not by way of limitation. For example, those skilled in the art will recognize how to adjust resin blending conditions, extrusion conditions and product manufacturing conditions to facilitate the manufacture and use of the foam made in accordance with the inventive method. Other embodiments of the invention will be within the capability of those of ordinary skill in the art upon reading the foregoing disclosure. Such embodiments are intended to fall within the scope of the claims appended hereto.

I claim:

1. In a method of preparing a thermoplastic foam body including the steps of
   (a) providing a molten composition of thermoplastic resin and an effective amount of nucleating agent,
   (b) introducing a quantity of 1,1-difluoroethane into the molten composition,
   (c) dispersing the 1,1-difluoroethane through the molten composition, and
   (d) extruding the molten composition through a die from a region of higher pressure to a region of lower pressure such that the composition foams upon extrusion to form a foam body;
   the improvement comprising introducing a quantity of $CO_2$ into said molten composition and dispersing said $CO_2$ through said molten composition prior to the extruding step, such that the quantity of $CO_2$ and 1,1-difluoroethane together in said molten composition is in a range Of about 0.1–5.0 parts per 100 parts thermoplastic resin by weight, and such that the ratio of the mass of 1,1-difluoroethane to the mass of $CO_2$ is in a range of about 0.5–8.0.

2. The method of claim 1 wherein said $CO_2$ is introduced into the molten composition in the gaseous state.

3. The method of claim 1 wherein the thermoplastic resin is polystyrene.

4. The method of claim 1 wherein the quantity of $CO_2$ and 1,1-difluoroethane together is in the range of about 2.0–4.5 parts per one hundred parts resin by weight, and wherein the composition foams upon extrusion to form a foam body having a density in the range of about 3.0–6.0 in lbs/ft$^3$.

5. The method of claim 1 wherein the quantity of $CO_2$ and 1,1-difluoroethane together is in the range of about 1–4 parts per one hundred parts resin by weight, the ratio of the mass of 1,1-difluoroethane to the mass of $CO_2$ is in the range of about 1–4, and the composition foams upon extrusion to form a foam body having a density in the range of about 6.0–8.0 lbs/ft$^3$.

6. The method of claim 1 wherein the quantity of $CO_2$ and 1,1-difluoroethane together is in the range of about 0.5–1.5 parts per one hundred parts resin by weight, the ratio of the mass of 1,1-difluoroethane to the mass of $CO_2$ is in the range of about 0.5–3.5, and the composition foams upon extrusion to form a foam body having a density in the range of about 8–14 lbs/ft$^3$.

7. The method of claim 1 wherein the quantity of $CO_2$ and 1,1-difluoroethane together is in the range of about 0.5–1.0 parts per one hundred parts resin by weight, the ratio of the mass of 1,1-difluoroethane to the mass of $CO_2$ is in the range of about 0.5–3.0, and the composition foams upon extrusion to form a foam body having a density in the range of about 8–14 lbs/ft$^3$.

8. In a method of preparing a thermoplastic foam body including the steps of (a) providing a molten composition of thermoplastic resin and an effective amount of nucleating agent, (b) introducing a quantity of blowing agent comprising 1,1-difluoroethane into the molten composition, (c) dispersing the blowing agent throughout the molten composition, and (d) extruding the molten composition through a die from a region of higher pressure to a region of lower pressure such that the composition foams upon extrusion to form a foam body; the improvement wherein said blowing agent consists essentially of an atmospheric gas and 1,1-difluoroethane.

9. The method of claim 8 wherein the atmospheric gas is $CO_2$.

10. The method of claim 9 wherein said $CO_2$ is introduced into the molten composition in the gaseous state.

11. The method of claim 8 wherein the molten composition comprises polystyrene.

12. The method of claim 9 wherein the $CO_2$ and 1,1-difluoroethane are introduced into the molten composition in separate steps.

13. The method of claim 9 wherein the quantity of $CO_2$ and 1,1-difluoroethane together is in the range of about 0.1–5.0 parts per one hundred parts thermoplastic resin by weight, and wherein the ratio of the mass of 1,1-difluoroethane to the mass of $CO_2$ is in the range of about 0.5–8.0.

14. The method of claim 13 wherein the quantity of $CO_2$ and 1,1-difluoroethane together is in the range of about 2.0–4.5 parts per one hundred parts resin by weight, and wherein the composition foams upon extrusion to form a foam body having a density in the range of about 3.0–6.0 in lbs/ft$^3$.

15. The method of claim 13 wherein the quantity of $CO_2$ and 1,1-difluoroethane together is in the range of about 1–4 parts per one hundred parts resin by weight, the ratio of the mass of 1,1-difluoroethane to the mass of $CO_2$ is in the range of about 1–4, and the composition foams upon extrusion to form a foam body having a density in the range of about 6.0–8.0 lbs/ft$^3$.

16. The method of claim 13 wherein the quantity of $CO_2$ and 1,1-difluoroethane together is in the range of about 0.5–1.5 parts per one hundred parts resin by weight, the ratio of the mass of 1,1-difluoroethane to the mass of $CO_2$ is in the range of about 0.5–3.5, and the composition foams upon extrusion to form a foam body having a density in the range of about 8–14 lbs/ft$^3$.

17. The method of claim 13 wherein the quantity of $CO_2$ and 1,1-difluoroethane together is in the range of about 0.5–1.0 parts per hundred parts resin by weight, the ratio of the mass of 1,1-difluoroethane to the mass of $CO_2$ is in the range of about 0.5–3.0, and the composition foams upon extrusion to form a foam body having a density in the range of about 8–14 lbs/ft$^3$.

18. In a method of preparing a thermoplastic foam body including the steps of (a) providing a molten composition of thermoplastic resin and an effective amount of nucleating agent, (b) introducing a quantity of blowing agent comprising 1,1-difluoroethane into the molten composition, (c) dispersing the blowing agent throughout the molten composition, and (d) extruding the molten composition through a die from a region of higher pressure to a region of lower pressure such that the composition foams upon extrusion to form a foam body; the improvement wherein said blowing agent further comprises an atmospheric gas and is essentially free of alkanes, chlorinated hydrocarbon compounds and chlorofluorocarbon compounds.

19. The method of claim 18 wherein the atmospheric gas is carbon dioxide.

* * * * *

US005411683B1

REEXAMINATION CERTIFICATE (4127th)

United States Patent [19]

Shah

[11] B1 5,411,683
[45] Certificate Issued Aug. 1, 2000

[54] METHOD FOR MAKING THERMOPLASTIC FOAM WITH COMBINED 1,1-DIFLUOROETHANE AND $CO_2$ BLOWING AGENT

[75] Inventor: Basit H. Shah, Evans, Ga.

[73] Assignee: Sweetheart Cup Company, Inc., Chicago, Ill.

Reexamination Request:
No. 90/005,428, Jul. 23, 1999

Reexamination Certificate for:
Patent No.: 5,411,683
Issued: May 2, 1995
Appl. No.: 08/110,276
Filed: Aug. 20, 1993

[51] Int. Cl.[7] .................................................. B29C 44/20
[52] U.S. Cl. ........................ 264/50; 264/53; 264/DIG. 5; 521/97
[58] Field of Search ................ 264/50, 53; 269/DIG. 5; 521/97

[56] References Cited

U.S. PATENT DOCUMENTS

| | | |
|---|---|---|
| 2,666,036 | 1/1954 | Schwencke . |
| 2,746,088 | 5/1956 | Lindemann et al. . |
| 2,829,117 | 4/1958 | Lindemann . |
| 2,848,739 | 8/1958 | Henning . |
| 2,928,130 | 4/1960 | Gray . |
| 2,941,964 | 6/1960 | Houston et al. . |
| 3,113,116 | 12/1963 | Smythe et al. . |
| 3,160,688 | 12/1964 | Aykanian et al. . |
| 3,251,911 | 5/1966 | Hansen . |
| 3,301,798 | 1/1967 | Waterman et al. . |
| 3,344,215 | 9/1967 | DeWitz et al. . |
| 3,523,988 | 8/1970 | Roehr et al. . |
| 3,632,705 | 1/1972 | Makowski . |
| 3,640,918 | 2/1972 | Fuchs . |
| 3,723,237 | 3/1973 | Fuss . |
| 3,751,537 | 8/1973 | Scotto et al. . |
| 3,758,425 | 9/1973 | Jastrow et al. . |
| 3,760,968 | 9/1973 | Amberg et al. . |
| 3,770,670 | 11/1973 | Kuhlow et al. . |
| 3,787,542 | 1/1974 | Gallagher et al. . |
| 3,835,209 | 9/1974 | Karabedian . |
| 3,855,053 | 12/1974 | Fuss . |
| 3,864,444 | 2/1975 | Johnson . |
| 3,871,802 | 3/1975 | Blackwelder . |
| 3,933,548 | 1/1976 | Anderson, Jr. . |
| 3,960,792 | 6/1976 | Nakamuro . |
| 3,970,620 | 7/1976 | Ihde, Jr. . |
| 3,972,970 | 8/1976 | Taylor . |
| 3,979,000 | 9/1976 | Karabedian . |
| 3,981,649 | 9/1976 | Shimano et al. . |
| 3,988,404 | 10/1976 | Orimo et al. . |
| 4,053,346 | 10/1977 | Amberg et al. . |
| 4,069,934 | 1/1978 | Karabedian . |
| 4,070,310 | 1/1978 | Schneider et al. . |
| 4,084,490 | 4/1978 | Doherty . |
| 4,101,467 | 7/1978 | Park et al. . |
| 4,124,336 | 11/1978 | Johnson . |
| 4,205,137 | 5/1980 | Akiyama . |
| 4,307,134 | 12/1981 | Milkovich et al. . |
| 4,308,352 | 12/1981 | Knaus . |
| 4,309,160 | 1/1982 | Poutanen et al. . |
| 4,333,898 | 6/1982 | Schmidtchen . |
| 4,344,710 | 8/1982 | Johnson et al. . |
| 4,369,227 | 1/1983 | Hahn et al. . |
| 4,376,741 | 3/1983 | Stenzel . |
| 4,419,309 | 12/1983 | Krutchen . |
| 4,420,448 | 12/1983 | Krutchen . |
| 4,422,877 | 12/1983 | Spitzer et al. . |
| 4,424,287 | 1/1984 | Johnson . |
| 4,436,679 | 3/1984 | Winstead . |
| 4,455,272 | 6/1984 | Schubert et al. . |
| 4,463,861 | 8/1984 | Tsubone et al. . |
| 4,464,320 | 8/1984 | Saidla . |
| 4,464,484 | 8/1984 | Yoshimura et al. . |
| 4,470,938 | 9/1984 | Johnson . |
| 4,476,159 | 10/1984 | Mead et al. . |
| 4,521,541 | 6/1985 | Rutherford et al. . |
| 4,528,300 | 7/1985 | Park . |
| 4,547,328 | 10/1985 | Yuto et al. . |
| 4,567,681 | 2/1986 | Fumel . |
| 4,568,702 | 2/1986 | Mascioli . |
| 4,574,020 | 3/1986 | Fosnaught . |
| 4,578,231 | 3/1986 | Molteni . |
| 4,579,710 | 4/1986 | Krutchen et al. . |
| 4,581,262 | 4/1986 | Karabedian . |
| 4,585,679 | 4/1986 | Karabedian . |
| 4,591,606 | 5/1986 | Bergstrom . |
| 4,596,832 | 6/1986 | Ariga et al. . |
| 4,598,098 | 7/1986 | Krutchen et al. . |
| 4,636,527 | 1/1987 | Suh et al. . |
| 4,657,715 | 4/1987 | Myers et al. . |
| 4,747,983 | 5/1988 | Colombo . |

(List continued on next page.)

FOREIGN PATENT DOCUMENTS

| | | |
|---|---|---|
| 529339 | 6/1983 | Australia . |
| 2031970 | 6/1991 | Canada . |
| 406206 | 1/1991 | European Pat. Off. . |
| 450331 | 10/1991 | European Pat. Off. . |
| 0 406 206 A2 | 11/1992 | European Pat. Off. . |
| 1520790 | 7/1969 | Germany . |
| 61-141424 | 1/1988 | Japan . |
| 63-118927 | 11/1989 | Japan . |

OTHER PUBLICATIONS

Shankland et al., "Diffusion of Gases in Closed Cell Foams; A Comparison of Experiment with Theory", ANTEC '86, pp. 34–37, 1986.

Zwolinski, L.M. and Dwyer, F.J., *Extruded Plystyrene Foam with CFC/Caron Dioxide Blowing Agents,* ANTEC '86, pp. 30–33.

*Primary Examiner*—Allan R. Kuhns

[57] ABSTRACT

A method is disclosed for making thermoplastic foam wherein the blowing agent is a combination of 1,1-difluoroethane and $CO_2$ gas. Applicant has found that the combined blowing agents unexpectedly have significantly enhanced blowing agent efficiency, so that 1 lb of $CO_2$ gas per hour can replace as much as 2–3 lbs 1,1-difluoroethane per hour, while still providing satisfactory efficiency as a blowing agent. The foams so produced are capable of being manufactured into foam articles of acceptable quality. Preferred proportions of the blowing agents to produce foams of desired densities are disclosed.

U.S. PATENT DOCUMENTS

| | | |
|---|---|---|
| 4,889,669 | 12/1989 | Suzuki . |
| 4,996,242 | 2/1991 | Lin . |
| 4,997,706 | 3/1991 | Smits et al. . |
| 5,082,608 | 1/1992 | Karabedian et al. . |
| 5,106,882 | 4/1992 | Suh et al. . |
| 5,120,481 | 6/1992 | Brackman et al. . |
| 5,120,770 | 6/1992 | Doyle et al. . |
| 5,147,896 | 9/1992 | York . |
| 5,149,726 | 9/1992 | Deblander . |
| 5,158,986 | 10/1992 | Cha et al. . |
| 5,162,381 | 11/1992 | Richard et al. . |
| 5,189,071 | 2/1993 | Rhoads et al. . |
| 5,189,072 | 2/1993 | Rhoads et al. . |
| 5,204,169 | 4/1993 | York . |
| 5,215,691 | 6/1993 | Bland et al. . |
| 5,244,927 | 9/1993 | Binder et al. . |
| 5,244,928 | 9/1993 | Smith et al. . |
| 5,250,577 | 10/1993 | Welsh . |
| 5,269,987 | 12/1993 | Reedy et al. . |
| 5,288,740 | 2/1994 | Park et al. . |

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4–7 and 14–17 is confirmed.

Claims 1–3, 8–13 and 18–19 are cancelled.

* * * * *